United States Patent [19]
Goh et al.

[11] Patent Number: 5,802,023
[45] Date of Patent: Sep. 1, 1998

[54] METHOD AND CIRCUIT FOR UNIFORMLY CONTROLLING SLED VELOCITY OF A DISK DRIVE

[75] Inventors: Young-Ok Goh; Do-Soo Lee, both of Suwon, Rep. of Korea

[73] Assignee: Samsung Electronics Co., Ltd., Kyungki-Do, Rep. of Korea

[21] Appl. No.: 723,536

[22] Filed: Sep. 30, 1996

[30] Foreign Application Priority Data

Nov. 20, 1995 [KR] Rep. of Korea ............... 1995 42256

[51] Int. Cl.$^6$ ............................................. G11B 7/00
[52] U.S. Cl. ........................... 369/44.28; 369/44.34
[58] Field of Search ........................ 369/44.28, 44.29, 369/54, 44.34, 44.35, 32; 360/78.11, 77.03, 69, 78.05, 78.04

[56] References Cited

U.S. PATENT DOCUMENTS

| | | | |
|---|---|---|---|
| 4,426,694 | 1/1984 | Kimura | 369/44.28 |
| 4,494,255 | 1/1985 | Kimura | 369/44.25 |
| 4,531,206 | 7/1985 | Kimura | 369/44.13 |
| 5,210,726 | 5/1993 | Jackson et al. | 369/44.28 |

*Primary Examiner*—Thang V. Tran
*Attorney, Agent, or Firm*—Sughrue, Mion, Zinn, Macpeak & Seas, PLLC

[57] ABSTRACT

A circuit for uniformly controlling the velocity of a sled of a disk drive includes a circuit for converting a velocity to a frequency through a speed sensor used for driving the disk drive, a circuit for amplifying a voltage of the speed sensor to a stable value, a circuit for converting the frequency to a voltage variation value, a circuit for selecting and maintaining a maximum value of the voltage variation value, a circuit for forwardly/backwardly inverting the voltage variation value, and a circuit for carrying out subtraction between the inverted value and a shift control signal, with the result of the subtraction being applied to a drive circuit to minimize power consumption.

6 Claims, 5 Drawing Sheets

5,802,023

METHOD AND CIRCUIT FOR UNIFORMLY CONTROLLING SLED VELOCITY OF A DISK DRIVE

BACKGROUND OF THE INVENTION

1. Field of the Invention

The present invention relates to a method and circuit for uniformly controlling the velocity of a sled of a CD-ROM disk drive which eliminates a search delay phenomenon caused by set-to-set assembly variations. A set-to-set variation can be a difference in deck loading characteristics or a difference in the driving circuit.

The present application for a method and circuit for uniformly controlling sled velocity of a disk drive is based on Korean Application Serial No. 42256/1995 which is incorporated herein by reference for all purposes.

2. Description of the Related Art

Generally, a CD-ROM drive is a system requiring both high speed and accurate position control. FIG. 1 illustrates a conventional uniform velocity controlling circuit of a sled motor which is used in a CD-ROM drive with 4 times velocity manufactured by SONY Co., in Japan. First and second sensors 101 and 111 are Hall devices and are installed so as to be perpendicular to a rotation axis of a servo motor. The first and second sensors 101 and 111 sense states according to the rotation of the rotation axis of the servo motor. The outputs of the first and second sensors 101 and 111 are amplified in first and second amplifiers 103 and 113, and differentiated in first and second differentiators 119 and 121, respectively. The first and second differentiators 119 and 121 detect edges of signals detected in the first and second amplifiers 103 and 113. The outputs of the first and second amplifiers 103 and 113 are inverted in first and second inverters 105 and 115, and differentiated in third and fourth differentiators 123 and 125, respectively. The third and fourth differentiators 123 and 125 detect edges of signals inverted in the first and second inverters 105 and 115. The outputs of the first and second inverters 105 and 115 drive first and second switching pulse generators 107 and 117, respectively, to generate switching pulses. The outputs of the first and second switching pulse generators 107 and 117 are multiplied to a frequency of constant times through first and second multipliers 109 and 110. The second multiplier 110 generates one pulse per 100 tracks. The outputs of the first to fourth differentiators 119, 121, 123 and 125 are selected in a switch and pulse select signal generator 127 according to the outputs of the first and second switch pulse generators 107 and 117. The selected signal is amplified in an amplifier 129. The output of the amplifier 129 is supplied to an addition/subtraction circuit 131. The addition/subtraction circuit 131 carries out addition/subtraction between the output of an operating control terminal 185 and the output of the amplifier 129. A driver circuit 133 controls a sled motor 135 by driving the output of the addition/subtraction circuit 131.

However, construction of the uniform velocity controlling circuit shown in FIG. 1 is complicated and therefore expensive to produce. Moreover, since the first and second sensors constructed with the Hall devices should accurately maintain a 90° phase difference, manufacturing this circuit is complicated. Furthermore, there is a search delay because the shift velocity may vary from set-to-set due to differences in the load of a deck or a driving operation of the drive circuit.

SUMMARY OF THE INVENTION

It is an object of the present invention to provide a method and circuit for uniformly controlling the velocity of a sled which reduces a search delay resulting from set-to-set variations in driving circuits.

It is another object of the present invention to provide a circuit for uniformly controlling the velocity of a sled which has a reduced manufacturing cost by reducing the number of components which are used, thus simplifying the manufacturing process.

In accordance with one aspect of the present invention, a sled uniform velocity controlling circuit of a disk drive includes a circuit for converting a velocity to a frequency through a speed sensor used for driving the disk drive, a circuit for amplifying a voltage of the speed sensor to a stable value, a circuit for converting the frequency to a voltage variation value, a circuit for selecting and maintaining a maximum value of the voltage variation value, a circuit for forwardly/backwardly inverting the voltage variation value, and a circuit for carrying out subtraction between the inverted value and a shift control signal to minimize power consumption.

BRIEF DESCRIPTION OF THE DRAWINGS

In the detailed description of the preferred embodiments of the present invention presented below, reference is made to the accompanying drawings, in which.

DETAILED DESCRIPTION OF THE PREFERRED EMBODIMENT

The present invention will be fully discussed with reference to the accompanying drawings.

Figure 1:
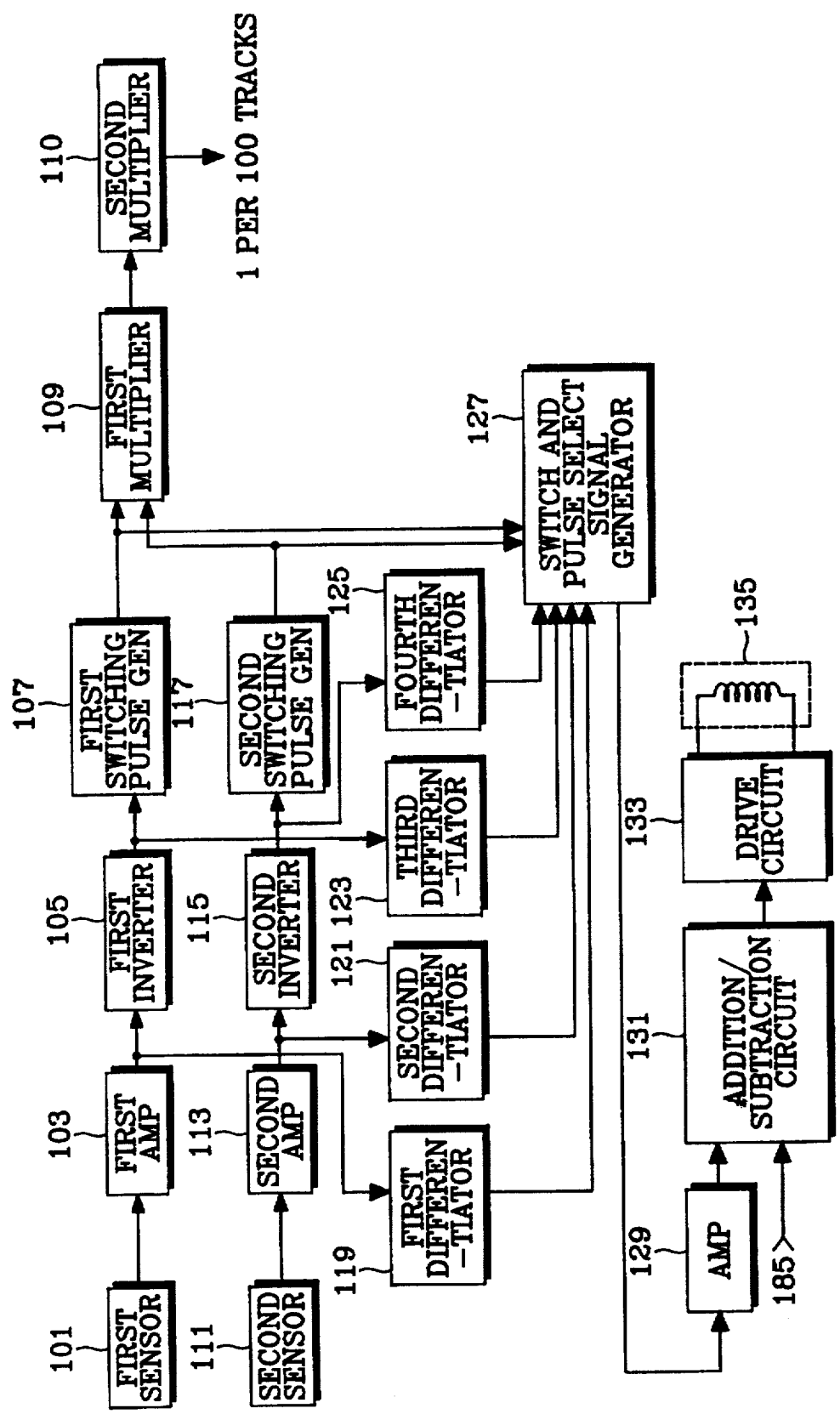
FIG. 1 is a block diagram of a conventional sled motor controlling circuit of a disk drive.
Figure 2:
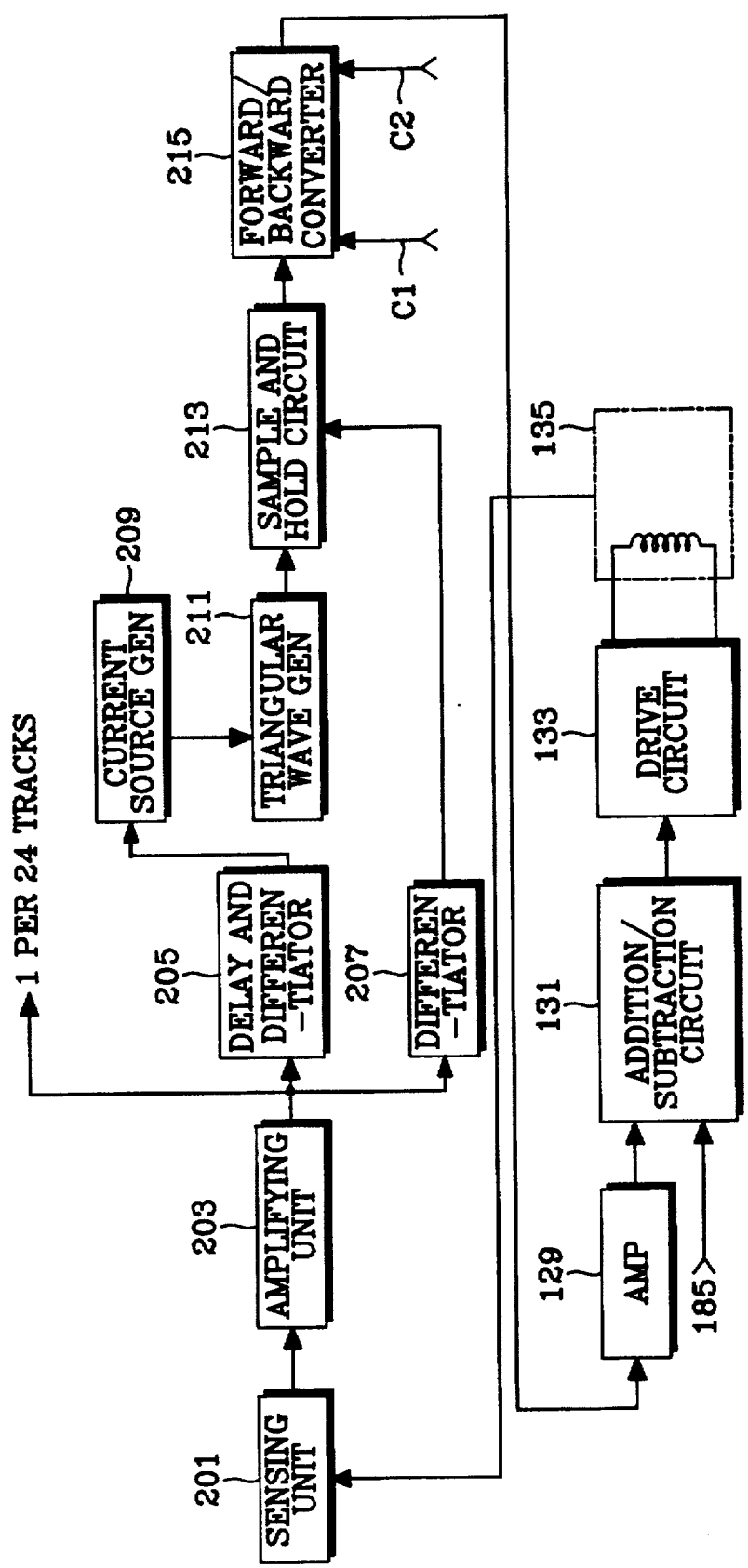
FIG. 2 is a block diagram of a sled motor uniform velocity controlling circuit of a disk drive according to the present invention.

Referring to FIG. 2, a sensing unit 201 senses a pulse of a track. An amplifying unit 203 amplifies the output of the sensing unit 201 to generate one pulse per 24 tracks. A delay and differentiator 205 delays and differentiates the output of the amplifying unit 203. A differentiator 207 differentiates the output of the amplifying unit 203. A current source generator 209 supplies a current for generating a triangular wave according to the output of delay and differentiator 205. A triangular wave generator 211 receives power from the output of the current source generator 209 and generates the triangular wave. A sample and hold circuit 213 samples and holds the output of the triangular wave generator 211 according to the output of the differentiator 207. A forward/backward converter 215 converts the output of the sample and hold circuit 213 to a voltage in response to input control signals applied to forward and backward control terminals C1 and C2. Another amplifier 129 amplifies the output of the forward/backward converter 215. An addition/subtraction circuit 131 carries out addition/subtraction between the output of the amplifier 129 and the control signal of a sled shift control terminal 185 to minimize power consumption. A drive circuit 133 controls a sled motor. Detailed circuits thereof are shown in FIG. 3.

Figure 3:
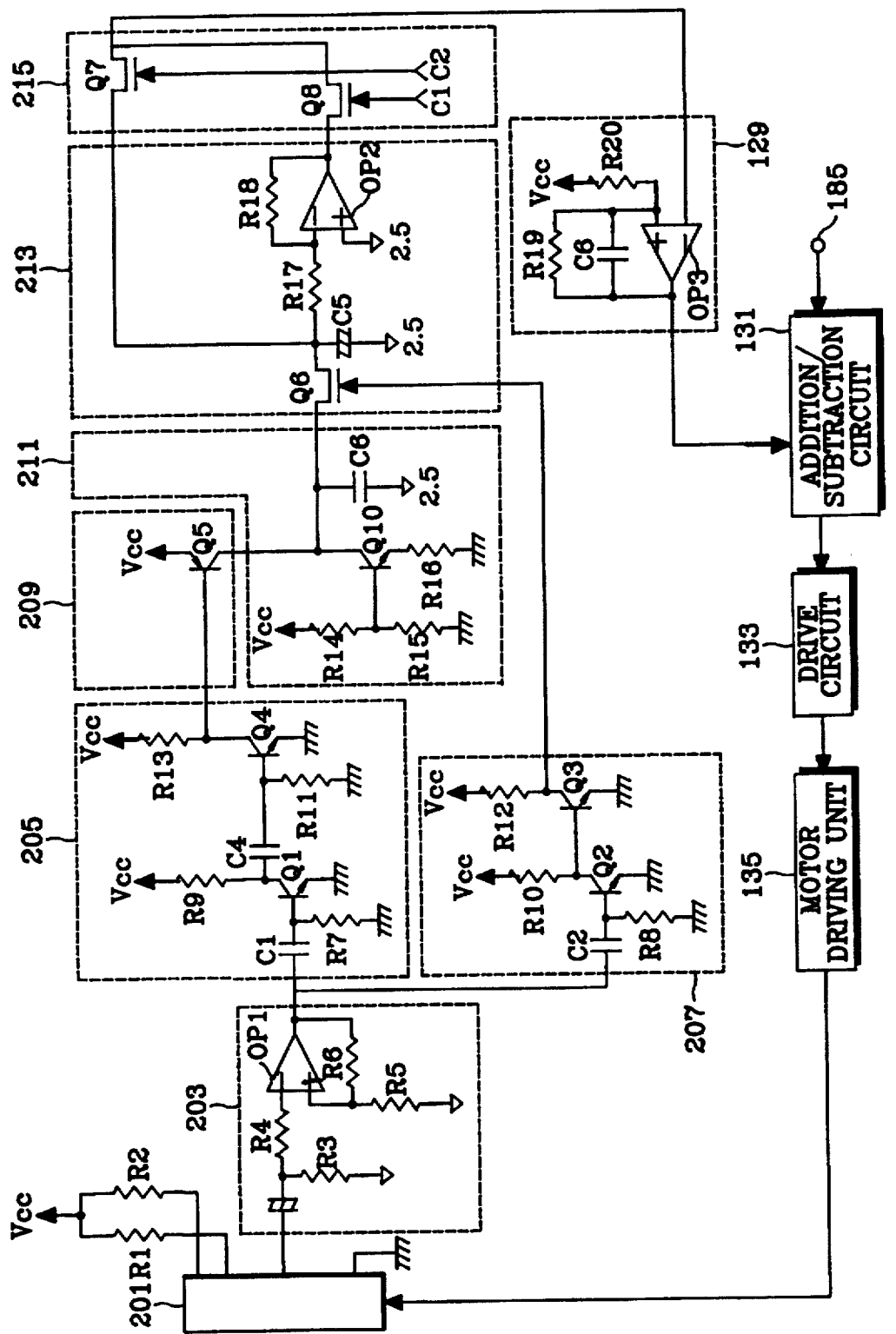
FIG. 3 is a more detailed circuit diagram of the uniform velocity controlling circuit of FIG. 2 except for the motor driver, a drive circuit and an addition/subtraction circuit.
Figures 4A, 4B, 4C, 4D, 4E, 4F:
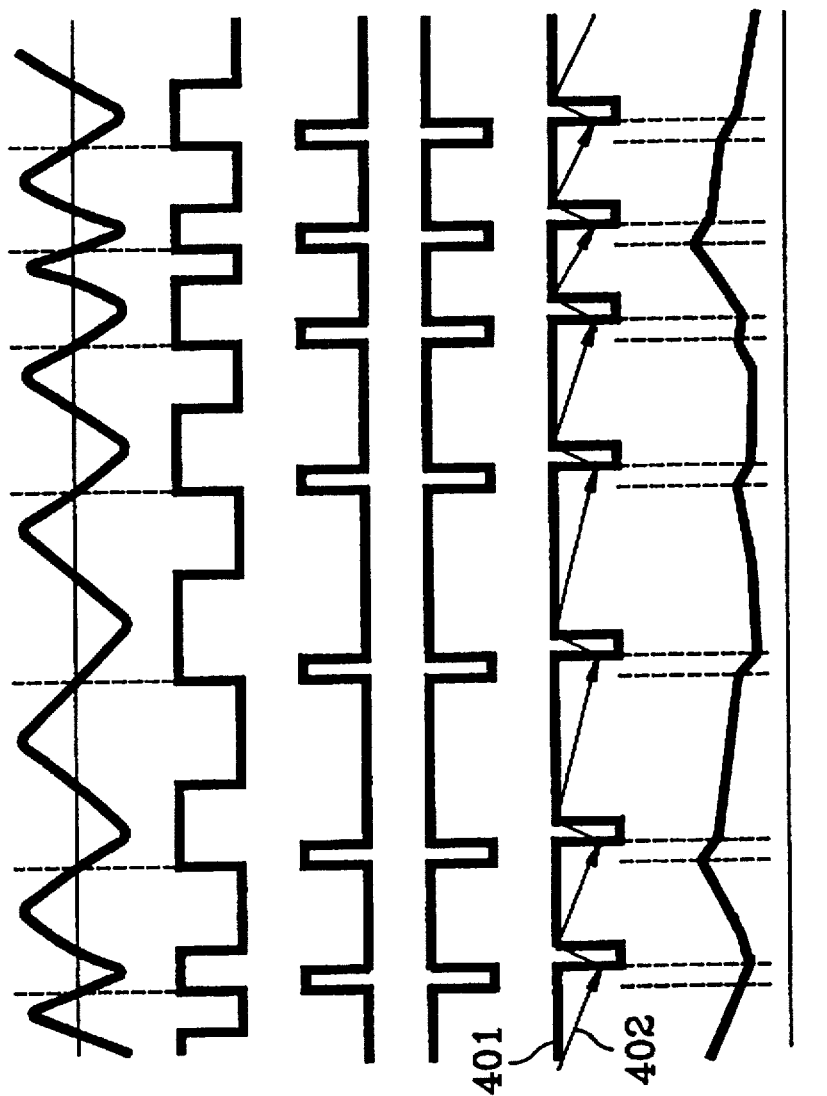
FIGS. 4A to 4I are operational waveforms showing output states of portions of FIG. 3.
Figures 4G, 4H, 4I:
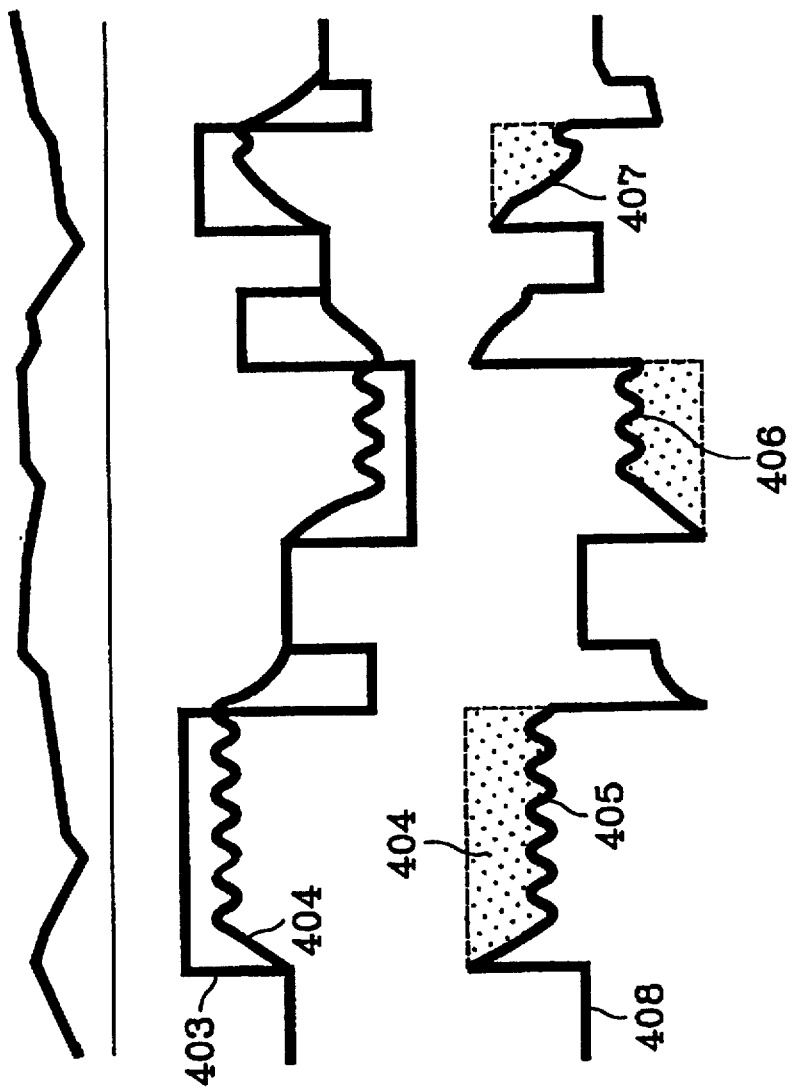

FIGS. 4A to 4I are waveforms showing an operation of the circuits of FIG. 3. FIG. 4A illustrates a sensing signal waveform of the sensing unit 201. FIG. 4B is an output waveform of an operational amplifier OP1 of the amplifying unit 203. FIG. 4C is an output waveform of the collector of a transistor Q3 of the differentiator 207. FIG. 4D is an output waveform of the collectors of transistors Q1 and Q2 of the delay and differentiator 205 and the differentiator 207. FIG. 4E shows output waveforms of the delay and differentiator 205 and the triangular wave generator 211. FIG. 4F shows an input waveform of the sample and hold circuit 213. FIG. 4G is an output waveform of the sample and hold circuit 213. FIG. 4H is an example for carrying out addition/subtraction of the addition/subtraction circuit 131 between the output of the forward/backward converter 215 and the output of the sled shift control terminal 185. Signal 403 represents a sled movement controlling signal which is applied to the addition/subtraction circuit 131, and signal 404 represents the output of the amplifier 129. FIG. 4I shows a sled control signal maintaining uniform velocity.

In operation, the sensing unit 201 constructed with a photo coupler generates a track sensing signal as shown in FIG. 4A. The sensing signal is supplied to an inverting terminal (−) of an operational amplifier OP1 of the amplifying unit 203 through a resistor R4. This sensing signal is compared with a reference value determined by resistors R5 and R6 connected to a non-inverting terminal (+) of the operational amplifier OP1 and generated as a square wave generating one pulse per 24 tracks, as indicated in FIG. 4B. This square wave is applied to the delay and differentiator 205 and the differentiator 207. The square wave applied to the delay and differentiator 205 is differentiated through a capacitor C1 and a resistor R7, and applied to the base of a transistor Q1, thereby generating the signal shown in FIG. 4D through the collector of the transistor Q1. The signal shown in FIG. 4D is delayed through a capacitor C4 and a resistor R11 and supplied to the base of a transistor Q4, thereby generating a signal 401 of FIG. 4E through the collector of the transistor Q4. The square wave supplied to the differentiator 207 is differentiated through a capacitor C2 and a resistor R8 and generated as the signal indicated in FIG. 4D through the collector of a transistor Q2. This signal shown in FIG. 4D is supplied to the base of a transistor Q3 and generated as the signal shown in FIG. 4c through the collector of the transistor Q3.

Meanwhile, the signal 401 of FIG. 4E is supplied to the base of a transistor Q5. If the signal 401 is "LOW", the power source of 12V is supplied as a driving power source to the triangular wave generator 211. The triangular wave generator 211 generates a triangular wave 402 shown in FIG. 4E by a circuit of a transistor Q10 and a capacitor C6. If the triangular wave 402 is applied to a transistor Q6, the transistor Q6 is turned on or off according to the output of the differentiator 207, and the signal shown in FIG. 4F is generated. The signal shown in FIG. 4F is inverted as shown in FIG. 4G through an amplifier stage consisting of resistors R17 and R18 and an operational amplifier OP2. The signal shown in FIG. 4G is supplied to an FET transistor Q8 of the forward/backward converter 215, and the signal shown in FIG. 4F is supplied to an FET transistor Q7, thereby generating a signal 404 shown in FIG. 4h by the forward and backward control signals of the control terminals C1 and C2. The signal 404 is amplified through an operational amplifier OP3 of the amplifier 129 and supplied to the addition/subtraction circuit 131. The addition/subtraction circuit 131 carries out addition/subtraction between the output 404 of the amplifier 129 and the control signal of the sled shift control terminal 185, and generates a minimum sled control signal 408 of FIG. 4I for reducing the power consumption. As shown in FIG. 4I, since the sled control signal maintains uniform velocity at 405, 406 and 407, the heat and power dissipation can be reduced. That is, one pulse generating signal corresponding to 24 tracks per pulse by use of the sensing unit 201 of the photo coupler is amplified in the amplifying unit 203, and delayed in the delay and differentiator 205 and the differentiator 207. The triangular wave passing through the triangular wave generator 211 is applied to the sample and hold circuit 213 to adjust a sampling time.

The current source 209 and the triangular wave generator 211 adjust a current source so as to contain a wide frequency band, and maintain an increasing rate at a constant value so as to vary the height of the triangular wave according to the frequency generated from the triangular wave generator 211. The sample and hold circuit 213 implements sampling of a uniformly increased triangular wave to a generated point by using a pulse generated from the differentiator 207. The sampling value is converted to a voltage value from a frequency and inverted in the forward/backward converter 215. The addition/subtraction 131 controls the sled velocity by using the output of the forward/backward converter 215.

As described above, since the photo coupler is used for controlling the velocity of the sled motor, a difficulty in the manufacturing process is eliminated. Further, since a phase difference processing method is not used, problems such as a search delay etc., due to the deviation of a set, can be solved, and accurate and stable position control can be obtained.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A circuit for uniformly controlling a sled velocity of a disk drive, comprising:
   means for representing the sled velocity as a frequency signal;
   means for converting said frequency signal, corresponding to the sled velocity, to a voltage variation signal;
   means for selecting and maintaining values of said voltage variation signal;
   means for forwardly and backwardly inverting said selected and maintained values in response to first and second control signals; and
   means for carrying out subtraction between the inverted voltage variation values and a shift control signal to to drive a sled motor.

2. A method for uniformly controlling a sled velocity of a disk drive, comprising the steps of:
   converting the sled velocity to a frequency signal using a speed sensor, said frequency signal being processed to drive said disk drive;
   converting said frequency signal to a voltage variation signal;
   selecting and maintaining values of said voltage variation signal;
   forwardly and backwardly inverting said selected and maintained values; and
   carrying out subtraction between the inverted voltage variation values and a shift control signal to drive a sled motor.

3. A circuit for controlling a sled velocity of a disk drive, comprising:
   a sensor for sensing a pulse of a track of said disk drive;

a first amplifier for amplifying an output of said sensor to generate one pulse per 24 tracks;

a delay and differentiator for delaying and differentiating an output of said first amplifier;

a differentiator for delaying the output of said first amplifier;

a current source generator for supplying a current for generating a triangular wave according to an output of said delay and differentiator;

a triangular wave generator for receiving the current from said current source generator and generating the triangular wave;

a sample and hold circuit for sampling and holding an output of said triangular wave generator in response to an output of said differentiator;

a forward/backward converter for converting an output of said sample and hold circuit to a voltage corresponding to a frequency in response to control signals input to forward and backward control terminals;

a second amplifier for amplifying an output of said forward/backward converter;

an addition/subtraction circuit for carrying out addition/subtraction between an output of said second amplifier and a control signal of a sled shift control terminal to minimize power consumption; and a drive circuit for controlling a sled motor according to an output of said addition/subtraction circuit.

4. The circuit according to claim 1, wherein in said means for selecting and maintaining values of said voltage variation signal, said selected and maintained values are values corresponding to intervals of maximum variation of said voltage variation signal.

5. The method according to claim 2, wherein in said step for selecting and maintaining values of said voltage variation signal, said selected and maintained values are values corresponding to intervals of maximum variation of said voltage variation signal.

6. The method of claim 5, wherein said method further comprises a step for amplifying said frequency signal prior to converting said frequency signal to said voltage variation value.

* * * * *